Nov. 15, 1955  C. EISLER  2,723,861
CENTERING CHUCK
Filed Feb. 25, 1953
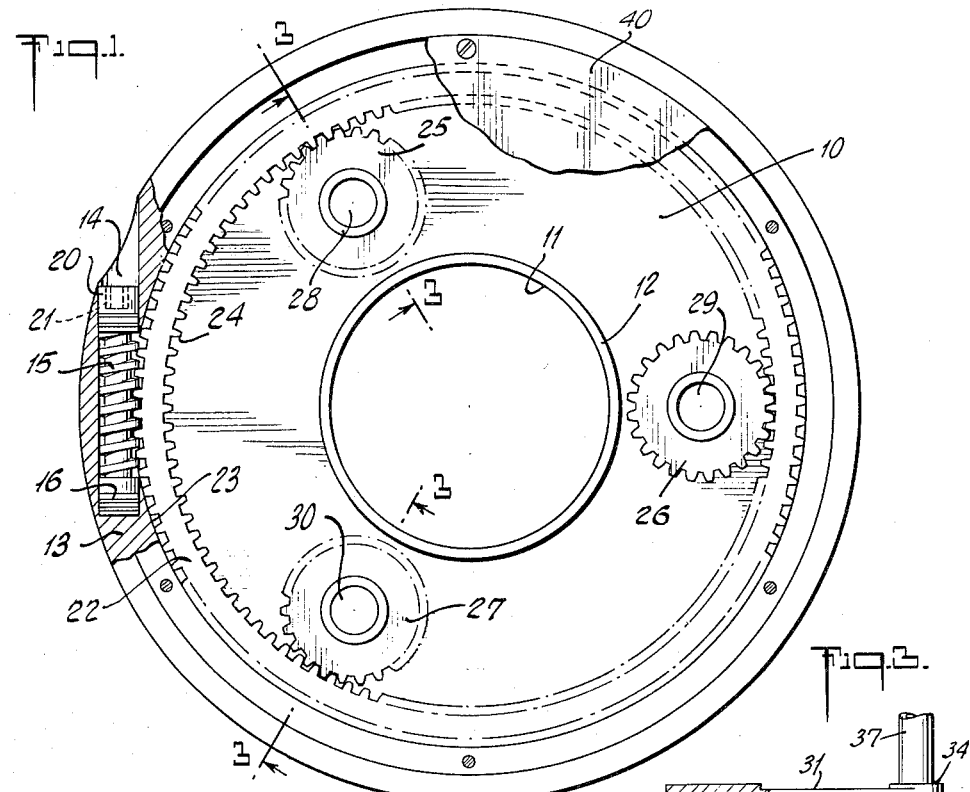
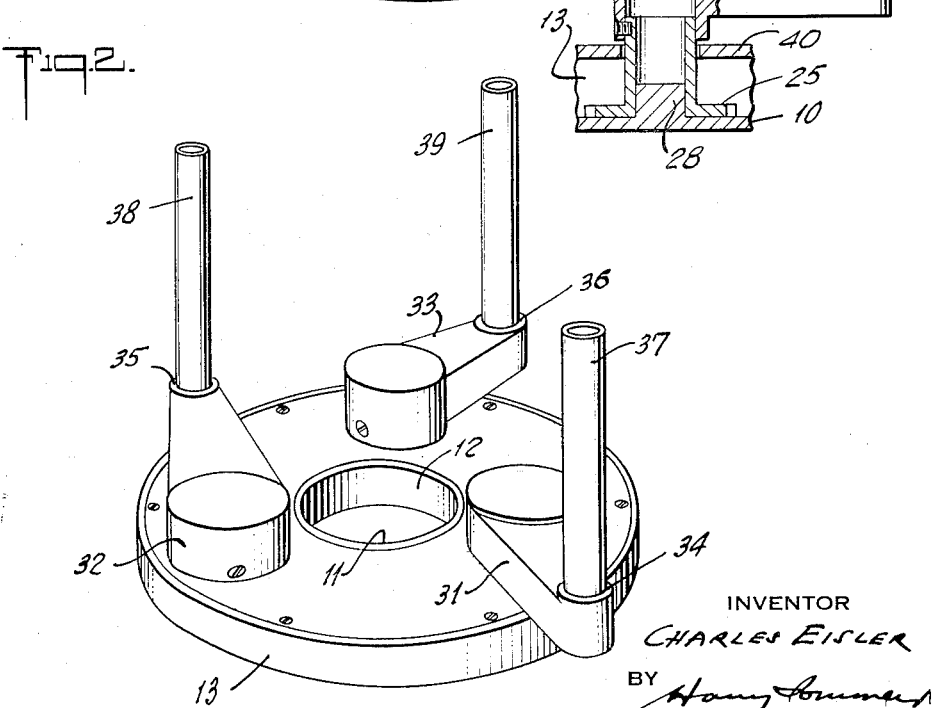
INVENTOR
CHARLES EISLER
BY
ATTORNEY

United States Patent Office 2,723,861
Patented Nov. 15, 1955

2,723,861

CENTERING CHUCK

Charles Eisler, South Orange, N. J.

Application February 25, 1953, Serial No. 338,859

2 Claims. (Cl. 279—106)

This invention relates to improvements in centering fixtures, adapted for example, for use in cooperation with other tools and machinery, the fixture of this invention being of such structural features that, by a simple operation in one direction of adjustment, parallel jaw posts thereof will move simultaneously to an outermost position for locking and holding a part and, when said operation is made in an opposite direction, the jaws will release the part therefrom.

The invention consists in a centering fixture having self-locking and certain other features of construction and operation, described below, and shown in the accompanying drawing, wherein:

Fig. 1 is a top plan view, partly fragmentary, of a centering fixture embodying the invention, Fig. 2 is a perspective view thereof, and Fig. 3 is a fragmentary sectional view, taken on line 3—3 of Fig. 1.

As shown in the drawing, the fixture comprises a flat disc 10 having a medial opening 11 which may be defined by an upstanding hub 12.

By virtue of its novel features of construction, the fixture of my invention has a large central opening 11 to facilitate securing the same readily to other tools or equipment. The disc 10 is provided with an upstanding circumferential flange portion 13 provided with a tangentially disposed recess 14 which opens through the outer circumferential face of the flange. A worm 15 is rotatably journalled in said recess and may be provided with anti-friction means 16. The free end 20 of said worm 15 is accessible at the outer end of the recess 14 as is indicated in Fig. 1, and may be provided with a socket key-portion as indicated at 21, for cooperation with a tool for rotation of the worm. A ring gear 22 is rotatably disposed on said disc 10 immediately within the flange portion 13 and is provided with an outer worm gear face 23 for meshing engagement with worm 15, and with an inner gear face 24 for meshing with a plurality of pinions 25, 26, 27, which may be of any desired number, three being shown for illustration in the drawing, and meshing with said inner gear face 24. The said pinions are freely rotatably journalled on stud shafts 28—30, upstanding on said disc. A cover plate 40 attached to flange 13, forms a casing therewith and disc 10 to enclose and retain the run gear 22 and the pinions 25—27 meshing therewith.

Each of said pinions has a hub extending thru a perforation in the cover plate, to which hub an arm is attached, said arms being indicated by the reference characters 31—33 of the drawings. The arms are parallel with the disc 10 and the free ends 34, 36 thereof are substantially offset from the ends which are keyed to the pinions and elongated jaws 37—39 or posts are secured to the free ends of the arms and extend therefrom in parallel relation to the axis of the disc.

Pursuant to the arrangement described, rotation of the worm 15 in one direction will effect corresponding rotation of the pinions and jaws keyed thereto to dispose said jaws in a given direction relative to the center of the disc. Thus, for example, to secure the work to the fixture, the worm 15 will be rotated so that said jaws would be moved to their outermost position relative to the open center 11 of the disc so as to engage the work. A reverse rotation of worm 15 will rotate the jaws inwardly and release the work held thereby. The invention thus provides a rapid and easy means for securing the work to the fixture.

The worm and worm gear arrangement described and shown is self-locking so that the jaw posts 37—39 will not release their grip on the work until the operator determines that the work should be released, at which time that end may be attained by simply rotating the worm 15. The arms 31—33 may be keyed to the pinions in any suitable or convenient manner, as, for example, by providing said pinions with hub portions integral therewith and extended through the cover member 40 for said disc 10 as shown in Fig. 3.

Having thus described my invention, what I claim as new and desire to secure by Letters Patent is:

1. A centering fixture comprising a casing, said casing comprising a flat circular disc having a center opening, a plurality of stub shafts supported by the disc and equidistantly located around the opening therein and in parallel relation to the axis thereof, a pinion freely mounted on each stub shaft for rotation in a plane parallel to the plane of the disc, arm members secured to said pinions at one end and jaw posts secured to the opposite ends of said arms and extending therefrom in parallel relation to the axis of the disc, whereby on rotation of said pinions in one direction, the arms and the jaw posts secured thereto will be thereby rotated toward the center of the fixture, and on rotation of the pinions in the opposite direction, will be rotated away from said center, a ring rotatably disposed in said casing and internally toothed for meshing engagement with said pinions, said ring being further externally toothed, and an elongated worm rotatably mounted in the casing in meshing engagement with the external face of the ring whereby rotation of said worm will effect corresponding rotation of the pinions.

2. In a centering fixture as set forth in claim 1, wherein said casing comprises a circumferential flange portion within which said ring is disposed, and said flange portion being provided with a tangential recess in which said worm is rotatably mounted, said recess opening through the inner wall of said flange portion for cooperative relation of the worm and external teeth on the ring and said recess also opening through the outer circumferential wall of said flange portion for operation access to said worm.

References Cited in the file of this patent

UNITED STATES PATENTS

| | | |
|---|---|---|
| 391,533 | Howard | Oct. 23, 1888 |
| 1,036,206 | Ferrier | Aug. 20, 1912 |
| 1,470,158 | Garrison | Oct. 9, 1923 |
| 1,668,948 | Cole | May 8, 1928 |
| 2,535,599 | Preston | Dec. 26, 1950 |